United States Patent [19]

Deeken et al.

[11] Patent Number: 4,495,126
[45] Date of Patent: Jan. 22, 1985

[54] ADHESIVE ACTIVATED EMULSION TO A POLYESTER YARN

[75] Inventors: William O. Deeken, Stow; Charles L. Davis, Akron, both of Ohio

[73] Assignee: The Goodyear Tire & Rubber Company, Akron, Ohio

[21] Appl. No.: 446,106

[22] Filed: Dec. 2, 1982

[51] Int. Cl.³ .................. B29G 5/00; B29C 25/00; D01D 5/12; D01F 11/00
[52] U.S. Cl. .................. 264/137; 264/210.8; 264/235.6; 264/289.6; 264/290.7
[58] Field of Search ........... 264/210.3, 210.4, 129, 264/137, 235.6, 210.8, 290.5, 290.7, 289.6; 427/175, 118; 28/246; 118/59; 523/315, 300–314

[56] References Cited

U.S. PATENT DOCUMENTS

| | | | |
|---|---|---|---|
| 3,091,805 | 6/1963 | Dusenbury | 264/289.6 |
| 3,102,323 | 9/1963 | Adams | 264/289.6 |
| 3,549,740 | 12/1970 | Schwarz | 264/210.3 |
| 3,793,425 | 2/1974 | Arrowsmith | 264/137 |
| 4,054,634 | 10/1977 | Marshall et al. | 264/210.3 |
| 4,387,069 | 6/1983 | Murase | 264/210.3 |

FOREIGN PATENT DOCUMENTS 1039014 8/1966 United Kingdom ............ 28/246

*Primary Examiner*—Jan Silbaugh
*Assistant Examiner*—Hubert C. Lorin
*Attorney, Agent, or Firm*—Alvin T. Rockhill

[57] ABSTRACT

A process for the application of an adhesive activated emulsion to a polyester yarn. More specifically the process involves applying an adhesive during drawing stage of the polyester yarn. The adhesive is applied to an essentially fully drawn yarn.

11 Claims, 2 Drawing Figures

ADHESIVE ACTIVATED EMULSION TO A POLYESTER YARN

BACKGROUND OF THE INVENTION

The present invention relates to a process for the application of an adhesive emulsion to a polyester yarn. More particularly, the present invention relates to a process for producing adhesive active polyester yarn, preferably polyethylene terephthalate, wherein the yarn is exposed to an adhesive emulsion during the drawing step. The yarn preferably is for use in the construction of pneumatic passenger tires and results in excellent adhesion of tire cord to rubber.

DESCRIPTION OF THE PRIOR ART

Polyester tire yarn requires the application of an adhesive layer to obtain bonding to the rubber. Two types of adhesive systems, a single dip and a double dip adhesive system, have been developed to meet this need.

In the double dip system, polyester yarn is treated with a first dip which is a dispersion of a phenol-block methylene bis phenylene diisocyanate, an epoxy resin, wetting agents and water. The treated cord is cured, then treated with a second dip of resorcinol-formaldehyde-latex and cured again.

In the single dip system, the adhesive layer is applied to the polyester yarn in an over finish subsequent to drawing of the yarn. The polyester yarn is piled into cords which are treated with a resorcinol-formaldehyde-latex dip and cured. The need for the block diisocyanate dip in cord processing is eliminated by the system. Low carboxyl polyester yarn treated with this system has very good ammonolytic and hydrolytic stability, but has poor adhesion to rubber when made into tire cord. Further, while regular carboxyl polyester yarn shows acceptable adhesion to rubber under normal curing temperatures, a reduction of the curing temperatures has been found to adversely affect adhesion to rubber. The present invention significantly improves yarn to rubber adhesion of polyester tire cords treated with a single dip system for a polyester yarn wherein normal curing temperatures are utilized and the dip system is employed during the drawing step.

SUMMARY OF THE INVENTION

The present invention provides an improvement in a process for the production of polyester yarn involving a drawing twisting step. The inventor has unexpectedly found that by applying the adhesive emulsion during the draw twisting orientation stage with the adaptations of a finish or kiss roll mounted between the heated platen and bottom heated draw roll, a high scrap waste has been alleviated. Another advantage of the present invention is the elimination of heating the emulsion in order to drive out the moisture which is known to effect the adhesion of the tire cord to rubber. The inventor has found that by applying the adhesive emulsion in the draw twist operation subsequent to contacting with the heated platen solves the problem and the heat of the drawn yarn and bottom roll effects the curing of the adhesives.

There is disclosed a process for the production of polyester yarn involving draw twisting, the improvement which comprises treating the yarn with an adhesive activated emulsion during the draw twisting stage.

Further disclosed is a process for the application of an adhesive activated emulsion to polyester yarn comprising; passing undrawn polyester yarn around a heated feed roll rotating with a surface speed in the range of 54 to 274 meters per minute, wherein said feed roll is at a temperature of from 80° C. to 125° C.; passing said yarn to and around a snup pin, thereafter; passing said yarn past a heated draw platen wherein said platen is at a temperature of from 190° C. to 235° C., thereafter; contacting said yarn with a means of supplying an adhesive activated emulsion thereafter; passing said yarn to a heated draw roll rotating with a surface speed in the range of 150 to 550 meters per minute, wherein said draw roll is at a temperature of from 125° C. to 170° C., thereafter; passing said yarn to a windup roll operating at a surface speed in the range of 150 to 550 meters per minute.

BRIEF DESCRIPTION OF THE DRAWINGS

The invention is further illustrated by the accompanying drawings in which corresponding parts identified by the same numerals and in which.

DESCRIPTION OF THE PREFERRED EMBODIMENT

In the process of manufacturing polyester yarn for use as reinforcement in rubber articles, it is known that at some point in the process, at least one drawing step is carried out wherein the yarn is stretched or drawn to orient the molecules therein thereby increasing the strength of the yarn. Various known methods for accomplishing such drawing of the yarn can be used in conjunction with the present invention, although it is preferred to use those means wherein the yarn is heated in air in contact with a heated surface such as heated rolls, heated platens, heated draw pins which may be heated internally (as internal electric heaters) or externally (as by radiant heaters) or combinations thereof.

The preferred polyesters used in the yarns of the present invention are the linear terephthalate polyesters. Such polyesters are formed by the reaction of a glycol containing from 2 to 20 carbon atoms and a dicarboxylic acid component containing at least about 75 percent terephthalic acid. The remainder, if any, of the dicarboxylic acid component may be any suitable dicarboxylic acid such as sebacic acid, adipic acid, isophthalic acid, sulfonyl-4,4'-dibenzoic acid, or 2,8-dibenzofuran-dicarboxylic acid. The glycol may contain more than 2 carbon atoms in the chain, e.g., diethylene glycol, butylene glycol, decamethylene glycol, and bis-1,4-(hydroxy-methyl)cyclohexane. Examples of linear terephthalate polyesters which may be employed include poly(ethylene terephthalate), poly(butylene terephthalate), poly(ethylene terephthalate/5-chloroisophthalate), poly(ethylene terephthalate/5-[sodium sulfo]isophthalate), poly(cyclohexane-1,4-dimethylene terephthalate), and poly(cyclohexane-1,4-dimethylene terephthalate/hexahydroterephthalate).

The present invention can be used in conjunction wit a variety of draw ratios such as from 2.2:1 to 6:1. As one skilled in the art realizes, depending on the type of spinning, desired output and denier of the yarn, various draw ratios such be utilized.

The yarns to be used with this invention can be processed by any conventional spin draw process or spinning and separate drawing process.

The present method of applying the adhesive emulsion to the fiber surface is most beneficial in that the emulsion goes onto a heated yarn surface and subsequently comes into contact with a heated roll. This in turn helps drive off the surface moisture on the yarn thus curing or partially curing the adhesive coating onto the yarn surface.

The inventor has found and shown that the amount of adhesive emulsion on the cord has no significant effect on the cord to rubber adhesion (see Table III for complete adhesion results.) The amount of adhesive emulsion is controlled by the speed of the applicator roll.

Figure 1:
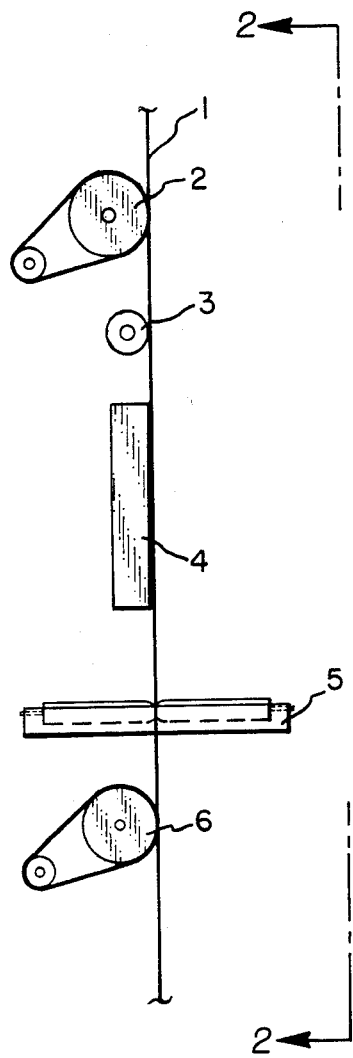
FIG. 1 is a schematic representation of the process of the invention.
Figure 2:
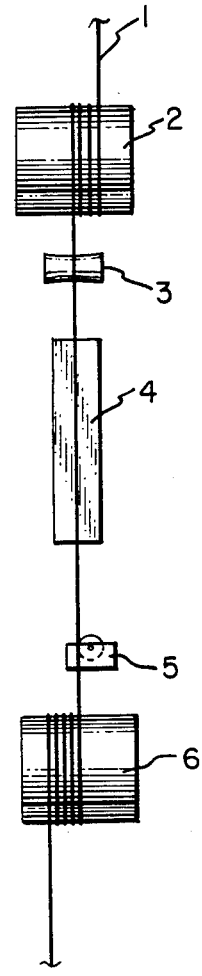
FIG. 2 is a schematic representation of the process of the invention taken along lines 2—2.

In carrying out a preferred embodiment of the process, (FIGS. 1 and 2) undrawn polyethylene terephthalate yarn (1) is passed to and around a feed roll (2) rotating with a surface speed in the range of 54 to 274 meters per minute and heated to a temperature between 80° C. and 125° C. The heated yarn is then passed to and around a snub pin (3). The heated yarn next passes a heated draw platen (4). The platen is at a temperature of between 150° C. and 235° C. Next the heated yarn comes in contact with a grooved finish roll (5). The roll is partially submerged in a finish though wherein the adhesive is contained. After the adhesive has been applied the yarn passes to and around a draw roll (6) rotating with a surface speed in the range of 150 to 550 meters per minute and heated to a temperature between 125° C. and 200° C. The fully drawn yarn is then passed to a windup operating at a surface speed in the range of 150 to 550 meters per minute. One skilled in the art realizes that the above referenced conditions are dependent upon the denier of the yarn being drawn and the equipment used.

The polyester undrawn yarn as used in the present specification and appended claims, generically denotes "a substantially unoriented multifilament yarn composed of a polyethylene terephthalate or a copolymer at least 75 mol percent of which are ethylene terephthalate units.

In the process of the present invention various denier yarn can be utilized. Preferably the drawn yarn has a denier ranging from 250 to 3000 denier.

In the process of the present invention, adhesive activated emulsion refers to a fluid consisting of a microscopically heterogeneous mixture containing epoxy resins. One example of such conventional adhesive activated emulsions are polyfunctional epoxy novolac resins. It should be understood most conventional adhesive activated emulsions can be used with the present invention.

Added to the adhesive activated emulsions are various conventional curing agents. Examples of such curing agents are acid anhydrides, boron trifluoride complexes, boric acid esters and various amines like primary, secondary, hydroxy aliphatic, aliphatic adducts, aromatic primary, phenolic tertiary amines and piperidine.

The following examples are supplied in order to illustrate, but not necessarily to limit, the process of the present invention.

EXAMPLE 1

A polyethylene terephthalate yarn having 12 carboxyl end groups and an IV of 0.88 was spun. The yarn was a 192 filament yarn and was treated with about 0.9 to 1.0% by weight of Lurol-346 commercially produced by George A. Goulston Co. The undrawn yarn was introduced to and passed to and around a feed roll rotating with a surface speed of 57 meters per minute. The feed roll was heated at a temperature of 110° C. The heated yarn was then passed to and around a snub pin. The heated yarn next passed a heated draw platen. The platen was at a temperature of 215° C. Next the heated yarn came into contact with a grooved finish roll. The finish roll was partially submerged in a finish trough wherein is contained an aqueous emulsion. The emulsion comprised the reaction product of CIBA®1138, water and USB 110. CIBA 1138 is a polyfunctional epoxy resin commercially produced by CIBA-GEIGY of Ardsley, N.Y., and USB 110 is 2-(β-dialkylaminoethoxy)-1,3,2-dioxaboxinane. The emulsion was at 2.5% solids. The finish roll was rotating at 100 revolutions per minutes (rpm). After the adhesive was applied, the yarn passed to and around a draw roll rotating with a surface speed of 315 meters per minute and was a temperature of 150° C. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 2

A polyethylene terephthalate yarn having 12 carboxyl end groups and an IV of 0.88 was spun. The yarn was a 192 filament yarn and was treated with about 0.9 to 1.0% by weight of Lurol-346. The same system and emulsion as Example 1 was repeated with the exception of the finish roll rotating at 130 rpm. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE III for physical properties of the cord and yarn to cord conversion.

EXAMPLE 3

A polyethylene terephthalate yarn having 12 carboxyl end groups and an IV of 0.88 was spun. The yarn was a 192 filament yarn and was treated with about 0.9 to 1.0% by weight of Lurol-346. The same system and emulsion as Example 1 was repeated with the exception of the finish roll rotating at 150 rpm. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 4

A polyethylene terephthalate yarn having 12 carboxyl end groups and an IV of 0.88 was spun. The yarn was a 192 filament yarn and was treated with about 0.9 to 1.0% by weight of Lurol-346. The same system as Example 1 was repeated with the exception of the aqueous emulsion. To the aqueous emulsion of Example 1 was added 0.25% by weight of Aersol OT commercially produced by American Cyanamid. The fully drawn yarn was then passed to a windup of an operating surface speed of 315 meters per minute. The physicals of the yarn can be seen in TABLE I. The drawn yarn was converted into 3-ply cords having 9×9 twists per inch. See Table II for physical properties of the cord and yarn to cord conversion.

EXAMPLE 5

A polyethylene terephthalate yarn having 12 carboxyl end groups and an IV of 0.88 was spun. The yarn was a 192 filament yarn and was treated with about 0.9 to 1.0% by weight of Lurol-346. The same system and aqueous emulsion of Example 1 with the exception that to the aqueous emulsion of Example 2 was added 5% by weight of methyl cellasolve commercially produced by Fisher Scientific. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 6

A polyethylene terephthalate yarn having 12 carboxyl groups and an IV of 0.88 was spun. The yarn was a 192 filament yarn and was treated with about 0.9 to 1.0% by weight of Lurol-346. The same system and emulsion of Example 5 was repeated with the exception of the finish roll rotating at 130 rpm. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 7

A polyethylene terephthalate yarn having 12 carboxyl groups and an IV of 0.88 was spun. The yarn was a 192 filament yarn and was treated with about 0.9 to 1.0% by weight of Lurol-346. The same system and emulsion as in Example 1 was repeated with the exception that the emulsion was added 5% by weight of Carolid ELF-C commercially produced by Ciba-Geigy of Ardsley, N.Y. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn conversion.

EXAMPLE 8

A polyethylene terephthalate yarn having 15 carboxyl end groups and an IV of 0.86 was spun. The yarn was a 192 filament yarn and was treated with about 0.9 to 1.0% by weight of Lurol-346. The same system and emulsion as Example 2 was repeated. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 9

The same lubricated polyethylene terephthalate yarn of Example 8 was treated with the same process and emulsion of Example 8 with the exception that the finish roll was rotating at 150 rpm. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 10 (CONTROL)

A polyethylene terephthalate yarn having 12 carboxyl end groups and an IV of 0.88 was spun. The yarn was a 192 filament yarn and was treated with about 0.9 to 1.0% by weight of Lurol-346. The yarn was then treated with the aqueous emulsion of Example 1 prior to drawing. The emulsion was applied by a conventional kiss roll. The yarn was then drawn in the same manner as Example 1 with the exception of no emulsion being added after drawing. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 11 (CONTROL)

A polyethylene terephthalate yarn having 12 carboxyl end groups and an IV of 0.88 was spun. The yarn was a 192 filament yarn and was treated with about 0.9 to 1.0% by weight of Lurol-346. The emulsion was applied by a kiss roll to the undrawn, fresh spun yarn. The emulsion was the same as in Example 1 with the exception of being 12.5% solids. The yarn was then drawn in the same manner as Example 1 with the exception that no emulsion was added after drawing. The fully drawn yarn was then passed to a windup at an operating surface speed of 155 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 12 (CONTROL)

A polyethylene terephthalate yarn having 12 carboxyl end groups and an IV of 0.88 was spun. The yarn was a 192 filament yarn and was treated with about 0.9 to 1.0% by weight of Lurol-346. The same system and emulsion was repeated as in Example 1 with the exception of the emulsion being 5.0 solids. The emulsion was applied by a kiss roll. Thereafter the treated yarn was then subjected to the process of Example 2 including the application of the adhesive (5.0% solids) after drawing. Therefore the treated yarn had two applications of adhesive, i.e., one before drawing and one after drawing. The twice treated yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 13 (CONTROL)

A polyethylene terephthalate yarn having 12 carboxyl end groups and an IV of 0.88 was spun. The yarn was a 192 filament. The double application process and emulsion of Example 12 was repeated with the exception of the emulsion was 2.5% solids. The twice treated yarn was then passed to a windup at an operating surface speed of 315 meters per minute. The physicals of the yarn can be seen in Table I. The drawn yarn was then converted into 3-ply cords having 9×9 twists per inch. See Table II for physical properties of the cord and yarn to cord conversion.

EXAMPLE 14

A polyethylene terephthalate yarn having 12 carboxyl number and an IV of 0.88 was spun. The yarn was of a 192 filament yarn, and was treated with 0.9 to 1.0% by weight of Lurol-346. The same system and emulsion of Example 2 was repeated with the exception of the emulsion being 5.0% solids. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 15

A polyethylene terephthalate yarn having 12 carboxyl number and an IV of 0.88 was spun. The yarn was of a 192 filament yarn and was treated with 0.9 to 1.0% by weight of Lurol-346. The same system and emulsion of Example 14 was repeated with the exception of the finish roll rotating at 150 rpm. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 16

A polyethylene terephthalate yarn having 12 carboxyl number and an IV of 0.88 was spun. The yarn was of a 192 filament yarn and was treated with 0.9 to 1.0% by weight of Lurol-346. The same system and emulsion of Example 2 was repeated. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

EXAMPLE 17

A polyethylene terephthalate yarn having 12 carboxyl number and an IV of 0.88 was spun. The yarn was a 192 filament yarn, and was treated with 0.9 to 1.0% by weight of Lurol-346. The same system and emulsion of Example 3 was repeated. The fully drawn yarn was then passed to a windup at an operating surface speed of 315 meters per minute. The physicals of the yarn can be seen in TABLE I. The drawn yarn was converted into 3-ply cords having 9×9 twists per inch. See TABLE II for physical properties of the cord and yarn to cord conversion.

TABLE I

ADHESIVE ACTIVATED TIRE YARN PROPERTIES

| Example No. | Denier | Tensile (lbs) | Elongation at Break (%) | Adhesive on Yarn % by weight | Finish Roll Speed (rpm) |
|---|---|---|---|---|---|
| 1 | 1028 | 19.1 | 12.2 | .23 | 100 |
| 2 | 1037 | 18.7 | 12.4 | .30 | 130 |
| 3 | 1026 | 18.1 | 8.8 | .75 | 150 |
| 4 | 1036 | 18.4 | 12.7 | .26 | 100 |
| 5 | 1036 | 19.4 | 12.6 | .27 | 100 |
| 6 | 1040 | 19.5 | 10.9 | .36 | 130 |
| 7 | 1045 | 18.5 | 11.9 | .21 | 100 |
| 8 | 1039 | 18.7 | 13.1 | .23 | 130 |
| 9 | 1020 | 17.7 | 9.6 | .48 | 150 |
| 10 | 1031 | 19.5 | 11.7 | .25 | — |
| 11 | 1001 | 19.2 | 9.1 | .67 | — |
| 12 | 1024 | 18.0 | 8.7 | 1.74 | 130 |
| 13 | 1019 | 19.2 | 9.5 | 1.60 | 130 |
| 14 | 1003 | 18.7 | 9.0 | 1.54 | 130 |
| 15 | 1026 | 19 | 8.1 | 1.88 | 150 |
| 16 | 989 | 18.8 | 10.0 | .61 | 130 |
| 17 | 999 | 19.6 | 9.4 | .98 | 150 |

TABLE II

ADHESIVE ACTIVATED TIRE CORD PROPERTIES

| Example No. | Denier | Tensile (lbs) | Elongation at Break | Load at 5% Elongation | Load at 10% Elongation | Yarn to Cord Conversion % |
|---|---|---|---|---|---|---|
| 1 | 3417 | 49.9 | 19.2 | 10.0 | 19.1 | 87.0 |
| 2 | 3365 | 47.5 | 17.3 | 10.0 | 20.2 | 86.2 |
| 3 | 3329 | 48.8 | 14.9 | 11.3 | 28.3 | 89.8 |
| 4 | 3422 | 50.2 | 18.0 | 10.1 | 20.3 | 90.9 |
| 5 | 3524 | 49.1 | 17.1 | 10.1 | 20.6 | 88.4 |
| 6 | 3418 | 49.3 | 16.7 | 10.4 | 21.9 | 84.2 |
| 7 | 3429 | 49.8 | 18.2 | 9.7 | 19.2 | 89.9 |
| 8 | 3507 | 49.5 | 19.4 | 9.7 | 18.4 | 88.2 |
| 9 | 3423 | 49.0 | 15.8 | 10.9 | 26.8 | 92.2 |
| 10 | 3416 | 50.3 | 16.8 | 11.3 | 24.7 | 86.0 |
| 11 | 3460 | 50.6 | 15.9 | 11.0 | 28.5 | 88.0 |
| 12 | 3466 | 48.1 | 15.4 | 9.7 | 24.0 | 89.0 |
| 13 | 3315 | 47.0 | 14.7 | 9.7 | 25.0 | 82.0 |
| 14 | 3389 | 49.0 | 15.1 | 10.0 | 25.2 | 87.0 |
| 15 | 3400 | 48.0 | 15.0 | 9.8 | 25.0 | 83.0 |
| 16 | 3357 | 48.5 | 14.9 | 10.2 | 25.2 | 86.0 |
| 17 | 3342 | 48.9 | 14.7 | 10.3 | 27.0 | 83.0 |

The treated tire cord from Examples 12–17 were tested for the adhesive bond between the dipped tire cord and rubber when subjected to high temperature. The test method was ASTM D2630. Results are listed below:

TABLE III

| Examples | Peel Force Kgs | Rating | Rubber Coverage |
|---|---|---|---|
| 12 | 26.0 | 96 | 70 |
| 13 | 29.0 | 107 | 100 |
| 14 | 26.5 | 98 | 95 |
| 15 | 25.5 | 94 | 95 |
| 16 | 24.0 | 89 | 100 |
| 17 | 26.0 | 96 | 100 |

The treated tire cord from Examples 12–17 were tested for its adhesion to rubber compounds of flexed and unflexed cords. The test method was ASTM D430. Results can be seen below:

TABLE IV

¼" Spindle 76° C. 4-hr Flex Time

| Examples | Unflexed lbs | Rating | Flexed lbs | Rating | Retained Adhesion % |
|---|---|---|---|---|---|
| 12 | 20.8 | 95 | 11.4 | 187 | 55 |
| 13 | 20.5 | 94 | 7.4 | 121 | 36 |
| 14 | 20.6 | 94 | 9.0 | 148 | 44 |
| 15 | 21.4 | 98 | 9.9 | 162 | 46 |
| 16 | 19.5 | 89 | 11.25 | 184 | 58 |

TABLE IV-continued

| | 3/4" Spindle 76° C. 4-hr Flex Time | | | | |
|---|---|---|---|---|---|
| | Unflexed | | Flexed | | Retained Adhesion |
| Examples | lbs | Rating | lbs | Rating | % |
| 17 | 18.5 | 84 | 10.25 | 168 | 55 |

What is claimed is:

1. A process for the application of an adhesive activated emulsion to polyester yarn comprising;
   a. passing undrawn polyester yarn around a heated feed roll rotating with a surface speed in the range of 54 to 274 meters per minute, wherein said feed roll is at a temperature of from 80° C. to 125° C.;
   b. passing said yarn to and around a snub pin, thereafter;
   c. passing said yarn past a heated draw platen wherein said platen is at a temperature of from 150° C. to 235° C., thereafter;
   d. contacting said yarn with a means of applying an adhesive activated emulsion, thereafter;
   e. passing said yarn to a heated draw roll rotating with a surface speed in the range of 150 to 550 meters per minute, wherein said draw roll is at a temperature of from 125° C. to 200° C., thereafter;
   f. passing said yarn to a windup roll operating at a surface speed in the range of 150 to 550 meters per minute.

2. A process of claim 1 wherein said feed roll has a surface speed of from 150 to 225 meters per minute and wherein said draw roll is at a surface speed of from 300 to 450 meters per minute.

3. A process of claim 1 wherein said means of applying the activated emulsion consists of a rotating grooved finish roll.

4. A process of claim 1 wherein said means of applying the activated emulsion consists of a metering finish guide.

5. A process of claim 1 wherein said activated emulsion comprises a polyfunctional epoxy novolac resin, water and a curing agent selected from the group comprising acid anhydrides, boron trifluoride complexes, boric acid esters, piperidine primary amines, secondary amines, hydroxy aliphatic amines, aliphatic adducts, aromatic primary amines and phenolic tertiary amines.

6. A process of claim 1 wherein said polyester is polyethylene terephthalate.

7. A process of claim 1 wherein said polyester is a copolymer, wherein at least 75 mol percent is ethylene terephthalate units.

8. A process of claim 1 wherein said undrawn yarn has an IV of 0.6 to 1.2.

9. A process of claim 1 wherein said yarn has a denier of from 250 to 3000, after having been drawn and treated with the adhesive activated emusion.

10. A process of claim 9 wherein said yarn has a denier of from 900 to 1600.

11. A process of claim 10 wherein said yarn has a denier of from 1000 to 1500.

* * * * *